Patented Apr. 23, 1940

2,198,373

UNITED STATES PATENT OFFICE 2,198,373

CROTONIC ACID ESTER OF POLYHYDRIC ALCOHOL

Herman A. Bruson, Philadelphia, Pa., assignor to Röhm & Haas Company, Philadelphia, Pa.

No Drawing. Original application August 23, 1933, Serial No. 686,443. Divided and this application September 23, 1938, Serial No. 231,329

7 Claims. (Cl. 260—486)

This invention relates to plasticizers for organic plastic substances and resinous material; and more particularly to plasticizers for cellulosic derivatives, such as cellulose esters and cellulose ethers, especially nitrocellulose and acetyl cellulose; and deals more specifically with the plasticizing of such resinous materials by incorporating intimately therewith a purified, vacuum-distilled polyhydric aliphatic alcohol ester of crotonic acid or an air-blown derivative thereof.

It is already known that a great many high boiling esters of organic acids are useful as plasticizers for cellulosic derivatives. In fact, practically all known esters of organic acids are compatible with nitrocellulose to a more or less degree and are capable of giving clear films therewith. Relatively few esters, however, are compatible with cellulose acetate, especially if such esters are high boiling liquids; the majority of the well known plasticizers such as castor oil, dibutyl phthalate, tricresylphosphate and the like being incompatible with cellulose acetate (except in very small amounts) and therefore useless therein as plasticizers since they produce unhomogeneous or turbid films.

It is also known that the esters of the lower fatty acids with polyhydric alcohols such as triacetin and tributyrin (tributylic glyceride) are readily compatible with cellulose acetate whereas tricaproin is not. On the other hand, triacetin is soluble in water and and relatively volatile, and is, therefore, undesirable in cellulose actate coatings as a plasticizer, while tributyrin, which is insoluble in water, readily hydrolyzes to form butyric acid which on account of its bad odor is likewise objectionable.

Certain esters of dibasic acids, notably diethyl phthalate, dibutyltartrate or the ethylene glycol monoethyl ether diester of phthalic acid, are known to be compatible with cellulose acetate, but also possess certain disadvantages in the film due either to evaporation or hydrolysis. The esters of crotonic acid and monohydric aliphatic alcohols of a boiling point sufficiently high to even be considered as possible plasticizers are, however, incompatible with cellulose acetate.

It was, therefore, quite surprising to find that the aliphatic polyhydric alcohol esters of crotonic acid as described herein when separated from resinous impurities by distillation in vacuo are pale, thin, high-boiling oils, and are not only readily compatible with cellulose acetate, except as limited hereinafter, but possess other useful physical properties. For example, they are unusually stable towards moisture or hydrolysis and possess an agreeable odor. In addition, they can be treated by the action of heat and air, i. e. they can be blown with air or oxygen-containing gas at an elevated temperature (about 140–180° C.) to convert them into practically non-volatile viscous oils or solid rubber-like masses of pale color, which are likewise compatible with nitrocellulose or acetylcellulose, if the air-blowing is not carried too far, and which have unusually good plasticizing properties.

For the purpose of this invention, the purified vacuum-distilled polyhydric alcohol esters of crotonic acid are preferred, such as can be prepared, for example, by heating crotonic acid (preferably in excess) with one of the group consisting of glycerol, pentaerythrite, triethylene glycol $HOCH_2—CH_2—O—CH_2CH_2—O—CH_2CH_2OH$, diethylene glycol $HOCH_2CH_2—O—CH_2CH_2OH$, trimethylene glycol $OH—CH_2—CH_2—CH_2OH$, ethylene glycol, and decamethylene glycol—1,10. Of these esters, those made from polyhydric aliphatic alcohols containing less than 7 carbon atoms are compatible with either cellulose acetate or nitrocellulose, whereas those made from higher polyhydric alcohols, such as decamethylene glycol, are compatible with nitrocellulose but not with cellulose acetate. The heating is carried out at a temperature of about 180–220° C. until the theoretical quantity of water has been split out by the esterification. A black more or less resinous mass is obtained which is useless unless suitably purified. The purification is carried out by distilling directly in high vacuo whereby unchanged crotonic acid and partially esterified products come over first, followed by the substantially pure ester. Deleterious resinous by-products of dark color remain behind in the still.

The properties of a few typical esters are as follows—

Glycol dicrotonate (from ethylene glycol)—B. P. 120° C. at 3 mm.
Diethyleneglycol dicrotonate (from diethyleneglycol)—B. P. 146–154° C. at 1 mm.
Triethyleneglycol dicrotonate (from triethyleneglycol)—B. P. 168–178° C. at 1 mm.
Glyceryl tricrotonate (from glycerol)—B. P. 170–210° C. at 1–2 mm.
Pentaerythrite crotonate (from pentaerythrite)—B. P. 197–230° C. at 1–2 mm.
1,10 - decamethyleneglycol dicrontonate (from 1,10-decamethylene glycol)—B. P. 185–187° C. at 1 mm.

For use as plasticizers the above esters are mixed either with the cellulosic lacquer in solution, or, for molded plastics, are directly incorporated by kneading as is customary in the art; the quantity to be used depending upon the degree of plastification desired.

The air-blown esters are prepared by heating any of the above purified esters, either alone or in admixture with each other, to a temperature of about 140-180° C. and passing a current of air or oxygen-containing gas through the liquid until the desired degree of bodying or increase in viscosity has occurred. This operation can be carried out in an inert organic solvent and catalysts to promote the oxidation can be added if desired, such as organic peroxides, or oxides and salts of heavy metals, particularly of cobalt, manganese, vanadium, and the like, which are known to have siccative properties in promoting oxidation of drying oils.

The purified crotonic esters of the dihydric aliphatic alcohols are thereby converted into extremely viscous pale yellow oils resembling blown or heat-bodied castor oil. Upon prolonged blowing with air at elevated temperatures, they do not readily tend to become solid. The purified trihydric, tetrahydric or higher polyhydric alcohol esters of crotonic acid, however, readily go over to very tough, solid rubber-like masses under the same conditions of air-blowing. The latter eventually become insoluble in all organic solvents when the air-blowing is prolonged, but the final product is much tougher, softer and more coherent than analogous linoxyn-like products made by air-blowing the natural drying or semi-drying oils. The blown polycrotonates are thus film forming materials in themselves and can find application as resins in coating compositions of the most diverse nature. For special purposes the purified crotonates described herein can be admixed with natural or synthetic drying oils, semi-drying oils, autoxidizable resins and the like, and the mixture then blown with air at an elevated temperature to produce extremely tough condensation products which are useful in coating compositions, adhesives, and plastics.

Lacquers containing resinous cellulose derivatives, notably nitrocellulose or cellulose acetate, plasticized with the polyhydric alcohol esters of crotonic acid of the type set forth herein, can be used on wood, metal, paper, leather, textile fabrics, artificial leather, or rubber to produce resistant coatings of good flexibility and adhesion. In general the weight ratio of plasticizer to cellulose derivative varies considerably with the surface and type of coating desired, and can best be determined only by experiment. A ratio of about 1 part by weight of plasticizer to 1 part cellulose derivative gives very flexible films suitable for use on absorbent surfaces such as leather, whereas for use on metal surfaces, a ratio of about 0.8 part by weight of the plasticizer will be found sufficient.

It is understood that the term "polyhydric alcohol" as used herein refers to aliphatic polyhydric alcohols which can be distilled in vacuum without decomposition and is meant to specifically exclude sugars or cellulose itself.

Although the vacuum distilled polyhydric alcohol esters of crotonic acid are good plasticizers for cellulosic derivatives, especially cellulose nitrate and acetate, they may also be used with other organic plastic materials such as phenol-formaldehyde resins and analogous brittle resins to toughen them.

This application is a division of copending application Serial No. 686,443, filed August 23, 1933.

It is understood that the above description is given by way of illustration only, and not of limitation, and that deviations are possible within the spirit of the invention, the scope of which is limited only by the following claims.

What I claim is:

1. A crotonic acid ester of a polyhydric alcohol selected from the group consisting of glycerol, pentaerythrite, the glycols, and glycol ethers having two hydroxyl groups.
2. Diethylene glycol dicrotonate.
3. Polyethylene glycol dicrotonate.
4. Glycerol tricrotonate.
5. A crotonic acid ester of glycerol.
6. Ethylene glycol dicrotonate.
7. A crotonic acid ester of ethylene glycol.

HERMAN A. BRUSON.